United States Patent [19]
Goretzki et al.

[11] Patent Number: 5,965,992
[45] Date of Patent: Oct. 12, 1999

[54] CHARGING CAPACITOR DURING TRACK FOLLOWING IN DISK DRIVE TO PROVIDE INCREASED VCM VOLTAGE DURING A SEEK

[75] Inventors: Jerome A. Goretzki; Hakam D. Hussein, both of Rochester, Minn.

[73] Assignee: Western Digital Corporation, Irvine, Calif.

[21] Appl. No.: 09/196,025

[22] Filed: Nov. 19, 1998

[51] Int. Cl.⁶ .................................................. H02K 23/00
[52] U.S. Cl. .......................... 318/254; 318/561; 318/109; 360/75
[58] Field of Search ..................... 318/254, 439, 318/561, 109; 360/75; 369/44.29, 44.25; 307/75

[56] References Cited

U.S. PATENT DOCUMENTS

| | | | |
|---|---|---|---|
| 5,631,527 | 5/1997 | Canckini | 318/254 |
| 5,633,568 | 5/1997 | Dunfield | 318/254 |
| 5,778,885 | 7/1998 | Doyama et al. | 128/182 |
| 5,844,743 | 12/1998 | Funches | 360/78.04 |

*Primary Examiner*—Robert E. Nappi
*Assistant Examiner*—Rita Leykin
*Attorney, Agent, or Firm*—Leo J. Young, Esq.; Milad G. Shara, Esq.

[57] ABSTRACT

A disk drive is connectable to a power supply having a fixed DC voltage. The disk drive includes a voice coil motor. The fixed DC voltage is supplied to a first node. A capacitor is coupled between the first node and a second node and is charged to approximately the fixed DC voltage by grounding the second node while the disk drive performs a track following operation. The DC voltage of the first node is increased to an increased DC voltage greater than the fixed DC voltage by providing the fixed DC voltage to the second node while to the disk drive performs a track seeking operation. The first node is de-coupled from the fixed DC voltage while the DC voltage of the first node is greater than the fixed DC voltage. The DC voltage of the first node is provided to the voice coil motor. The increased VCM voltage allows faster access times and more efficient VCM operation.

12 Claims, 3 Drawing Sheets

CHARGING CAPACITOR DURING TRACK FOLLOWING IN DISK DRIVE TO PROVIDE INCREASED VCM VOLTAGE DURING A SEEK

CROSS-REFERENCE TO RELATED PATENT APPLICATION

This patent application relates to commonly assigned patent application Ser. No. 09/108,597 entitled "Faster Access Time in Disk Drive by Utilizing Increased VCM Potential Voltage" filed on Jul. 1, 1998, which is herein incorporated by reference.

BACKGROUND OF THE INVENTION

1. Field of the Invention

The present invention generally relates to reducing data access time in disk drives. More particularly, the present invention relates to reducing seek times in disk drives by increasing a voltage supplied to a voice coil motor (VCM) of the disk drive.

2. Description of the Prior Art

In hard disk drives, data is stored on magnetic media disks in concentric data tracks, which are divided into groups of data sectors. Servo information including track number, sector number, and tracking information is recorded in radially continuous narrow wedges between the groups of data sectors. The disk drive includes an actuator assembly having a voice coil motor (VCM), an actuator arm extending from the VCM, and a transducer head disposed at the end of the actuator arm. One way of improving disk drive performance is to reduce data access time, including the time required to move the transducer head of the actuator assembly from a current data track to a selected target data track.

The disk drive performs a seek operation to move the transducer head from a present data track to a target data track. The disk drive includes a servo system employed to seek to the target data track and thereafter follow the target data track on the disk. The servo system controls the VCM so that the VCM swings the actuator and its attached transducer head to access the target data track. Therefore, if the torque developed ($T_d$) by the VCM could be increased, a corresponding reduction in data access time could be achieved. $T_d$ is given by the following Equations I:

Equations I $$T_d = Kt * I_{coil}$$

$$Kt = Ke (Kt \text{ in } Nm/A; Ke \text{ in } V/\text{rad/sec})$$

$$Bemf = Ke * Vel_{motor} (Vel_{motor} \text{ in rad/sec})$$

$$V_{applied} = V_{source} - Bemf = I_{coil} * R_t$$

$$I_{coil} = (V_{source} - Ke * Vel_{motor})/R_t$$

Where:

$T_d$ is the torque developed by the VCM;

Kt is the Torque constant of the VCM;

$I_{coil}$ is VCM coil current;

Ke is the Voltage constant of the VCM i.e. the Bemf factor;

Bemf is the back emf of the VCM;

$Vel_{motor}$ is the velocity of the VCM;

$V_{applied}$ is the voltage applied to the VCM coil;

$V_{source}$ is the voltage of the VCM power source supplying power to the VCM; and $R_t$ is the total resistance of the VCM coil and the power FETs driving the VCM coil from the VCM power source to ground.

As can be shown by Equations I above, $T_d$ can be increased by increasing Kt and/or $I_{coil}$. Unfortunately, increasing $I_{coil}$ causes a corresponding heating of the VCM coil, proportional to the square of the current, which can result in heat related breakdown of VCM components, including the VCM coil itself. In particular, seek operations require the highest current to be supplied to the VCM in order to achieve competitive access times. Conversely, increasing Kt equates to an equal increase in Ke which increases the Bemf of the VCM. Therefore, the Bemf approaches $V_{source}$ as Kt is increased. Consequently, if $V_{source}$ cannot be increased, less voltage $V_{applied}$ is available and $I_{coil}$ is reduced as Kt is increased thereby limiting the performance of the VCM. The $V_{source}$ supplied to the VCM in disk drives, however, is fixed because, for compatibility with host systems, a standard power supply having a fixed voltage is used to supply power to the VCM. This fixed voltage power supply to the VCM therefore limits how much effect the VCM can have on reducing access times.

For reasons stated above, there is a desire to reduce data access time during seek operations in disk drives. In particular, there is a need to improve VCM performance by increasing the torque constant of the VCM to achieve a corresponding decrease in data access time in seek operations in disk drives. It would also be desirable to increase the torque constant of the VCM to permit a reduction in VCM coil current to reduce $I^2R$ power losses in the system while still maintaining a given torque in the VCM.

SUMMARY OF THE INVENTION

The invention can be regarded as a disk drive that is connectable to a power supply having a fixed DC voltage. The disk drive includes a voice coil motor having a coil, a fixed DC voltage power conductor connectable to the power supply, a controller providing a charging control signal, a VCM voltage control circuit, and a voice coil motor driver. The charging control signal is at a first level while the disk drive is performing a track following operation and at a second level while the disk drive is performing a track seeking operation.

The VCM voltage control circuit includes a first node, a second node, and a ground node. A diode is coupled between the fixed DC voltage power conductor and the first node to provide the fixed DC voltage to the first node. A capacitor has a first terminal that is coupled to the first node and a second terminal that is coupled to the second node. A first switch is coupled between the fixed DC voltage power conductor and the second node and has a first control gate. A second switch is coupled between the ground node and the second node and has a second control gate. A switch control circuit is coupled to the first and second control gates. The switch control circuit is responsive to the charging control signal being at the first level to cause the first switch to turn off and the second switch to turn on to charge the capacitor to approximately the fixed DC voltage. The switch control circuit is responsive to the charging control signal being at the second level to cause the second switch to turn off and the first switch to turn on to increase the DC voltage of the first node to an increased DC voltage greater than the fixed DC voltage. The diode de-couples the first node from the fixed DC voltage power conductor while the DC voltage of the first node is greater than the fixed DC voltage. The voice coil motor driver has switching elements coupled to the first node and the coil of the voice coil motor which are controllable to provide the DC voltage of the first node across the coil.

The invention can also be regarded as a method of providing increased voltage to a voice coil motor in a disk drive connectable to a power supply having a fixed DC voltage. The method includes the step of receiving the fixed DC voltage from the power supply. Furthermore, the method includes the step of providing a charging control signal having a first level while the disk drive is performing a track following operation and having a second level while the disk drive is performing a track seeking operation.

The method further includes controlling a voltage to a first node by the following steps: (1) providing the fixed DC voltage to the first node; (2) grounding a second node in response to the charging control signal being at the first level; (3) charging a capacitor coupled between the first node and the second node to approximately the fixed DC voltage in response to the charging control signal being at the first level; (4) increasing the DC voltage of the first node to an increased DC voltage greater than the fixed DC voltage by providing the fixed DC voltage to the second node in response to the charging control signal being at the second level; and (5) de-coupling the first node from the fixed DC voltage while the DC voltage of the first node is greater than the fixed DC voltage. The method includes providing the DC voltage of the first node to the voice coil motor.

DESCRIPTION OF THE PREFERRED EMBODIMENTS

Figure 1:
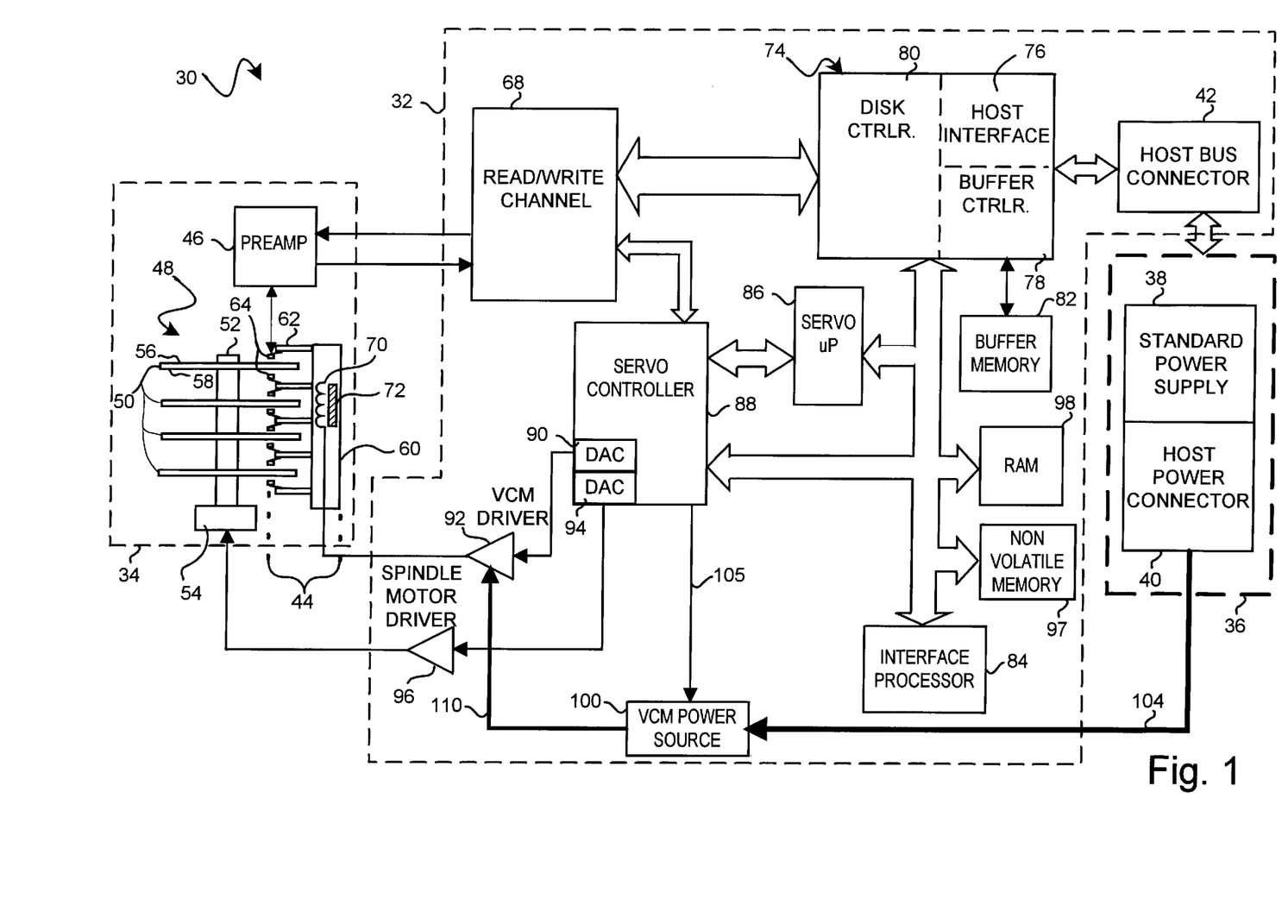
FIG. 1 is a block diagram of a hard disk drive of the invention and a corresponding host system power supply.

A hard disk drive according to the present invention is illustrated generally at 30 in FIG. 1. Disk drive 30 includes a disk controller circuit board 32 and a head disk assembly (HDA) 34. Disk controller circuit board 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Host system 36 includes a standard power supply 38 which supplies power to disk controller circuit board 32 via a power supply connector 40. Data is transmitted between host system 36 and disk controller circuit board 32 via a host bus connector 42.

HDA 34 includes an actuator assembly 44, a preamplifier 46, and a disk assembly 48. Disk assembly 48 includes a plurality of magnetic media disks, such as indicated at 50. Disks 50 are stacked on a spindle assembly 52. Spindle assembly 52 is mechanically coupled to a spindle motor 54 for rotating disks 50 at a high rate of speed. Each disk 50 includes two disk surfaces capable of storing data thereon, such as indicated at 56 and 58. Actuator assembly 44 includes a voice coil motor (VCM) 60 and actuator arms 62 extending from VCM 60. Each actuator arm 62 corresponds to a respective disk surface such as 56 or 58. A transducer head 64 is disposed at the end of each actuator arm 62, and each transducer head 64 is associated with a disk surface 56 or 58. Transducer heads 64 communicate with disk controller circuit board 32 via preamplifier 46 for reading and writing data to the transducer head's associated disk surface. Preamplifier 46 is electrically coupled to transducer head 64 for receipt and amplification of position signals representative of the position of transducer head 64. Preamplifier 46 provides an amplified signal to a read/write channel 68 of disk controller circuit board 32. Read/write channel 68 performs encoding and decoding of data written to and read from disks 50.

VCM 60 includes a coil 70 moving in proximity to a permanent magnet 72. Actuator arms 62 are permanently coupled to VCM 60. VCM 60 swings actuator arms 62 and their corresponding transducer heads 64 back and forth over their associated disk surfaces 56 or 58 to access target data tracks formed on the associated disk surface.

Disk control circuit board 32 includes a host interface and disk controller (HIDC) integrated circuit 74. HIDC 74 includes a host interface 76, a buffer controller 78, and a disk controller 80. Host interface 76 communicates with host system 36 via host bus connector 42 by receiving commands and data from and transmitting status and data back to host system 36. Buffer controller 78 controls a buffer memory 82 employed for storing data from host system 36 which is to be written to disks 50. In addition, buffer controller 78 controls buffer memory 82 for storing read data from disks 50 to be transmitted to host system 36 via host interface 76. Buffer memory 82 typically comprises random access memory (RAM), such as dynamic random access memory (DRAM).

Disk controller 80 sends data to and receives data from read/write channel 68. Disk controller 80 also provides for error correction and error detection on data transmitted to or read from disk 50.

An interface processor 84 handles the flow of data and commands received by host interface 76 by sending commands to and reading status from disk controller 80. Interface processor 84 ascertains which commands to process from host system 36 and when to process these commands, and directs other tasks performed by disk controller 80.

A servo processor 86 commands a servo controller 88 to control the position of transducer head 64 over disk 50 at a target data track for subsequent execution of read or write commands. Servo processor 86 receives a representative form of the position signals sensed by transducer head 64 and amplified by preamplifier 46 via read/write channel 68 and servo controller 88 and performs calculations to position transducer head 64 relative to its associated disk surface. Servo processor 86 commands a digital to analog converter (DAC) 90 in servo controller 88 to provide a corresponding analog signal to a VCM driver 92. VCM driver 92 responds to the analog signal from DAC 90 to provide a corresponding current to VCM 60. More specifically, the current from VCM driver 92 is provided to coil 70 of VCM 60 and causes movement of coil 70 which in turn causes attached actuator arm 62 to swing and thereby move transducer head 64 over an associated disk surface 56 or 58 to access target data tracks.

Servo processor 86 also provides commands to servo controller 88 to control the rotational velocity of spindle motor 54. A DAC 94 in servo controller 88 provides an analog signal to a spindle motor driver 96. Spindle motor driver 96 responds to the analog signal from DAC 94 to drive and thereby control the speed of spindle motor 54. Spindle motor driver 96 also detects a back EMF of spindle motor 54 and provides a signal representative of the spin-rate of spindle motor 54 to servo controller 88 which converts the signal into a monitored velocity signal which can be read by servo processor 86. In this way, servo processor 86 can control the spin-rate of spindle motor 54 via servo controller 88 to maintain a substantially constant spin-rate of rotating disks 50.

Disk system operational programs are stored in non-volatile memory 97, such as read-only memory (ROM) or flash memory, and can be all or partially loaded into RAM 98 for execution from RAM 98 or both RAM 98 and non-volatile memory 97. Alternatively, portions of disk system operational programs are stored on reserve cylinders on disk 50. Suitably, servo processor 86 may have integrated or separate memory (not shown) for storage of servo programs.

The current track position of transducer head 64 is stored by servo processor 86 to determine a required seek distance between the current data track and a target data track. Based on the required seek distance, servo processor 86 retrieves a corresponding read or write seek profile and provides a digital signal command to DAC 90 corresponding to the seek profile. The profile determines the performance of a seek operation and is highly dependent on the VCM dynamics, i.e. torque constant Kt and applied current $I_{coil}$ discussed above. DAC 90 provides a corresponding analog signal to VCM driver 92 representative of the seek profiles. VCM driver 92 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of servo wedges disposed on disk surface 56 or 58. Based on this position information, a position error signal is provided via preamplifier 46, read/write channel 68, and servo controller 88 to servo processor 86 to provide a representative position of transducer head 64 relative to its associated disk surface 56 or 58. Upon completion of a seek operation and the corresponding alignment of transducer head 64 over the target data track, a read or write command is executed to read data from or write data to the target data track.

VCM Boosted Voltage Power Source

According to the present invention, hard disk drive 30 includes a VCM power source circuit 100. VCM power source circuit 100 receives a regulated 12 volt power source on a fixed DC voltage power conductor 104 from standard power supply 38 of host system 36 via power supply connector 40. VCM power source circuit 100 supplies boosted voltage power on a power line 110 to VCM driver 92 which drives VCM 60. VCM power source circuit 100 supplies power independently of VCM 60. In other words, the back EMF generated in VCM 60 is not employed by VCM power source circuit 100.

VCM power source circuit 100 provides an increased voltage to VCM 60 via VCM driver 92 at least during seek operations. In one embodiment, VCM power source circuit 100 is controlled by servo controller 88 via a line 105 to generate the boosted voltage of VCM power source circuit 100 during track following operations and to provide the boosted voltage power source as the VCM power source on line 110 during seek operations. This increased voltage to VCM 60 significantly reduces access time during seek operations in disk drive 30 as compared to a conventional disk drive without VCM power source circuit 100.

The access time in disk drive 30 is reduced because the boosted voltage from VCM power source circuit 100 permits a higher torque constant to be used in VCM 60 than can be used by a VCM receiving a standard 12 volt power supply. The increased torque constant of VCM 60 allows greater torque to be developed by VCM 60, which reduces access time by reducing seek time.

In addition, the increased torque constant in VCM 60 permitted as a direct result of the boosted voltage from VCM power source circuit 100 can alleviate heat related breakdown of components of VCM 60 by not requiring as much current to pass through coil 70 to achieve an equivalent amount of torque in VCM 60. Additionally, a significant improvement in coil current rise time is obtained with boosted voltages to VCM 60. Moreover, switching time between the acceleration phase and the deceleration phase of the seek operation is also reduced by utilizing the boosted VCM voltages.

Figure 2:
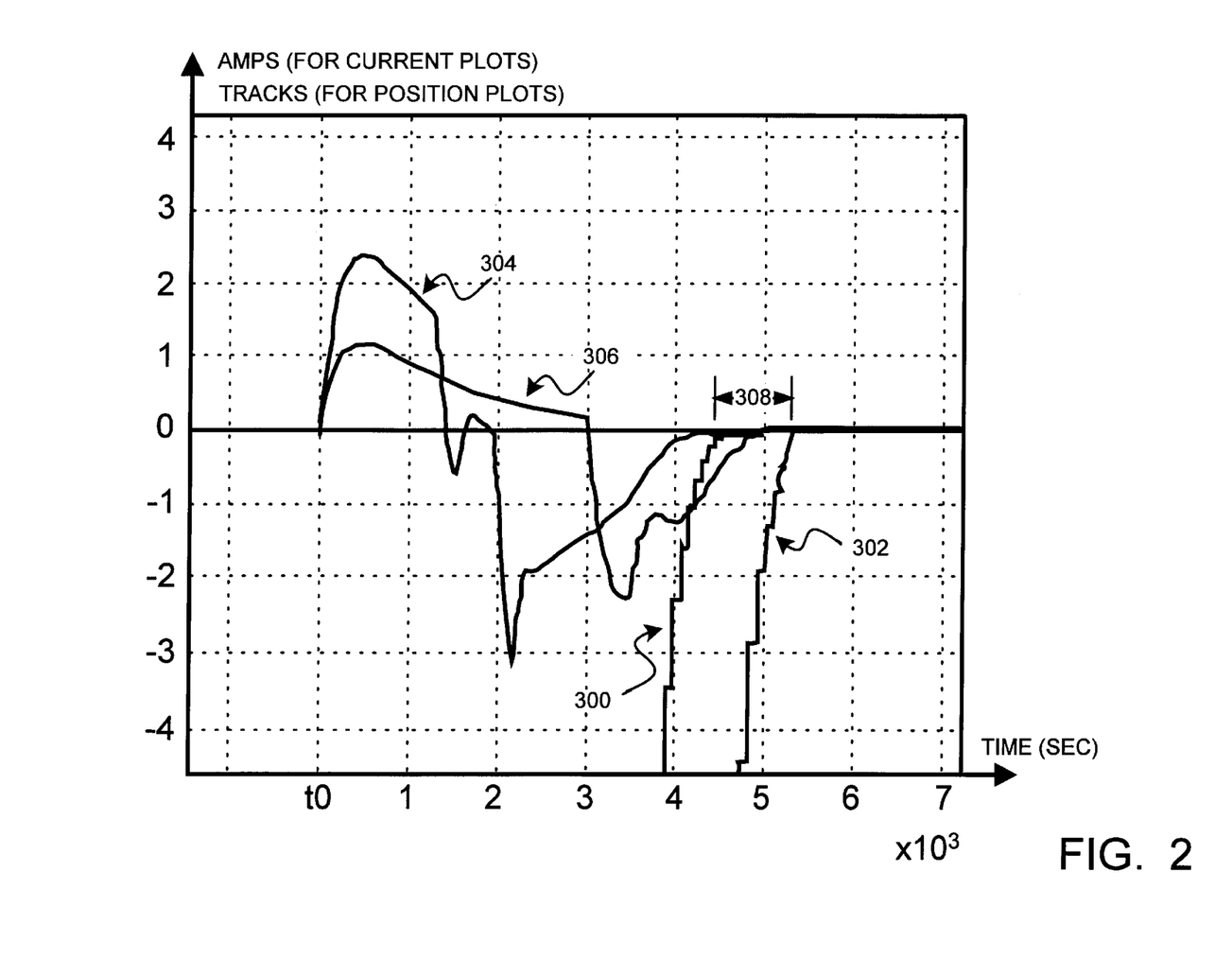
FIG. 2 is a graphical diagram illustrating track position and VCM coil current versus time for a 12 volt standard power supply and a 24 volt VCM power source according to the present invention.

Simulation results for a VCM using a 12 volt standard power supply and for using a 24 volt VCM power source according to the present invention from a somewhat idealized model of a seek operation in a disk drive are illustrated graphically in FIG. 2. FIG. 2 plots track position and VCM coil current versus time with a constant Kt for both cases of the motor. For reasons discussed above, a practical implementation would preferably use a motor having increased Kt to provide improved torque without suffering heating effects from higher current. In the seek operation modeled in FIG. 2, a transducer head moves from a current data track to a target data track during a seek traversing approximately one-third of the actuator stroke.

A curve 300 plots track position directly preceding arrival at the target track for a VCM receiving the 24 volt VCM power source during the deceleration phase of the model seek operation. Comparably, a curve 302 plots track position preceding arrival at the target track for a VCM receiving the 12 volt standard power supply during the deceleration phase of the model seek operation. A curve 304 plots VCM coil current for the VCM receiving the 24 volt VCM power source during the model seek operation including acceleration and deceleration phases. A curve 306 comparably plots VCM coil current for the VCM receiving the 12 volt standard power supply during the model seek operation.

As illustrated in FIG. 2, the coil current rise time is significantly reduced by using the 24 volt VCM power source according to the present invention during the model seek operation instead of the 12 volt standard power supply. Also, as indicated by interval 308, there is an approximate 20 percent reduction in the total model seek time with the 24 volt VCM power source according to the present invention.

VCM Voltage Control Circuitry

Figure 3:
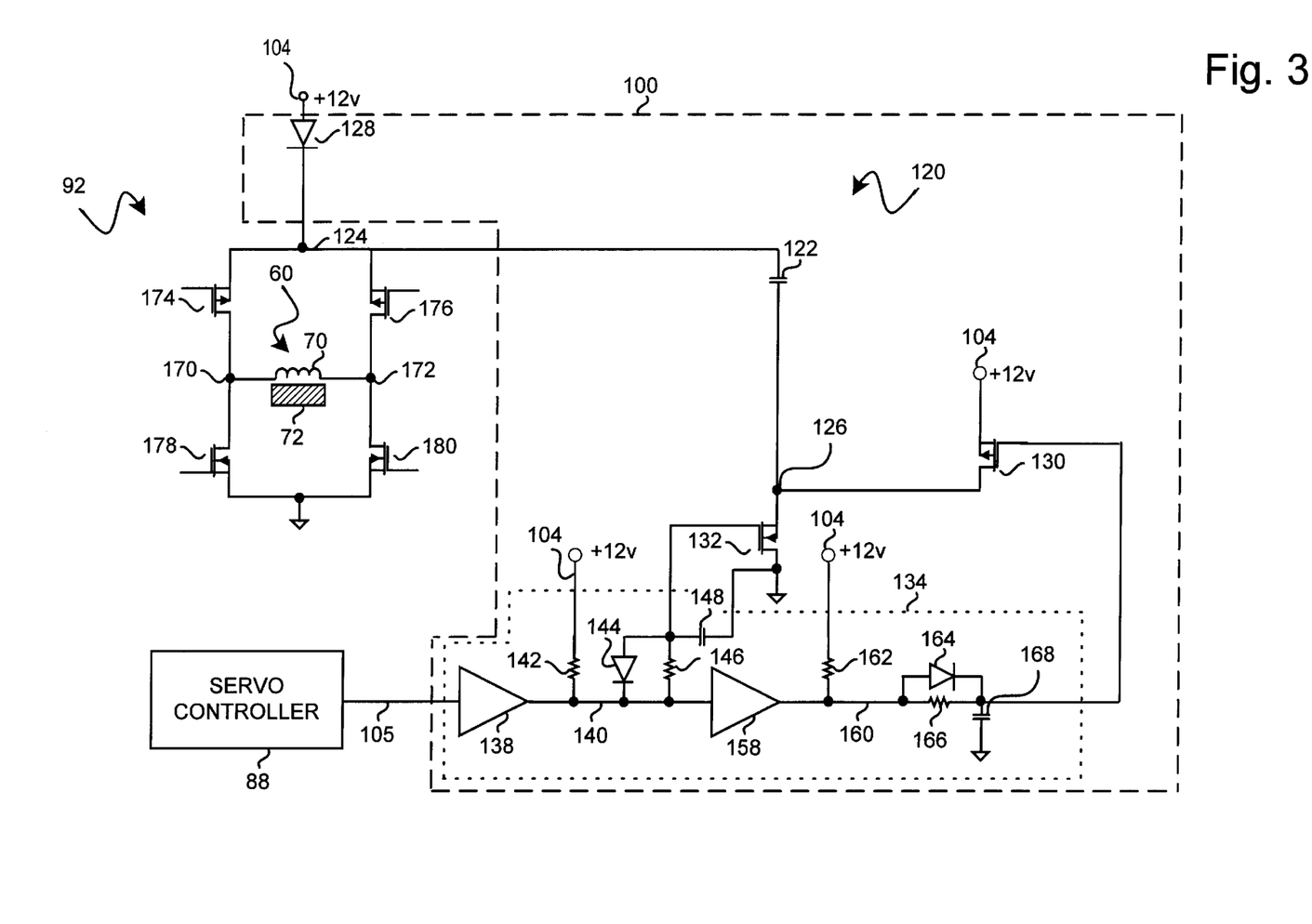
FIG. 3 is a schematic block diagram of a VCM voltage control circuit in the disk drive of FIG. 1.

One embodiment of VCM power source circuit 100 according to the present invention includes VCM voltage control circuitry 120 illustrated in FIG. 3. VCM voltage control circuitry 120 includes a boost capacitor 122 which is charged during a track following operation in disk drive 30. The stored energy in boost capacitor 122 is used by VCM 60 during seek operations in disk drive 30. VCM control circuitry 120 utilizes the boosted voltage from boost capacitor 122 as described below to significantly reduce the voltage rise time in coil 70 of VCM 60. The increased voltage from boost capacitor 122 during seek operations significantly reduces the access time by reducing the seek time. Short seek operations have the most significant performance increase because the boosted VCM voltage is utilized for a significant percentage of a total short seek operation.

VCM voltage control circuitry 120 of FIG. 3 is coupled as follows. Boost capacitor 122 is coupled between a VCM voltage supply node 124 and a node 126. VCM voltage supply node 124 is equivalent to power line 110 (shown in FIG. 1) from VCM power source 100 to VCM driver 92. A diode 128 is coupled between fixed DC voltage power conductor 104 and VCM voltage supply node 124. For example, in one embodiment, fixed DC voltage power conductor 104 is connected to standard 12 volt power supply 38 of host system 36 via host power conductor 40 and boost capacitor 122 is charged to provide a maximum boosted voltage of 24 volts on VCM voltage supply node 124.

A P-channel field effect transistor (P-FET) 130 is coupled between fixed DC voltage power conductor 104 and node 126. An N-channel field effect transistor (N-FET) 132 is coupled between a ground node and node 126. A switch control circuit 134 controls a gate of P-FET 130 and controls a gate of N-FET 132.

Servo controller 88 provides a charging control signal 105 to switch control circuit 134. Charging control signal 105 is at a high logic level while disk drive 30 is performing a track following operation. Charging control signal 105 is at a low logic level while disk drive 30 is performing a track seeking operation.

Switch control circuit 134 includes a buffer 138, such as an open collector buffer with high voltage output which receives charging control signal 105. Buffer 138 responds to charging control signal 105 being at a low logic level to provide a low voltage or ground voltage level on a node 140. Buffer 138 responds to the charging control signal being at a high logic level to provide a high voltage output of approximately 12 volts on node 140 via a resistor 142 coupled to the fixed DC voltage power conductor 104. A diode 144 is coupled between node 140 and the gate of N-FET 132. A resistor 146 is coupled parallel to diode 144 between node 140 and the gate of N-FET 132. A capacitor 148 is coupled between the ground node and the gate of N-FET 132.

Switch control circuit 134 includes a buffer 158, such as an open collector buffer with high voltage output, which receives the voltage level on node 140. Buffer 158 responds to a low voltage level on node 140 to provide a low voltage or ground voltage level on a node 160. Buffer 158 responds to a high voltage level on node 140 to provide a high voltage output of approximately 12 volts on a node 160 via a resistor 162 coupled to the fixed DC voltage power conductor 104. A diode 164 is coupled between node 160 and the gate of P-FET 130. A resistor 166 is coupled parallel to diode 164 between node 160 and the gate of P-FET 130. A capacitor 168 is coupled between the ground node and the gate of P-FET 130.

As illustrated in FIG. 3, one embodiment of VCM driver 92 includes four FETs coupled in a conventional H-Bridge construction across coil 70 of VCM 60. VCM coil 70 is coupled to the H-Bridge FETs of VCM driver 92 between a node 170 and a node 172. The H-Bridge FET construction of VCM driver 92 includes a P-FET 174 coupled between VCM voltage supply node 124 and node 170 and a P-FET 176 coupled between VCM voltage supply node 124 and node 172. The H-Bridge FET construction of VCM driver 92 also includes an N-FET 178 coupled between the ground node and node 170 and an N-FET 180 coupled between the ground node and node 172.

The FETs of VCM driver 92 are controlled such that P-FET 174 and N-FET 180 are turned on while P-FET 176 and N-FET 178 are off to thereby apply the voltage at VCM voltage supply node 124 to node 170 and to ground node 172. Similarly, while P-FET 176 and N-FET 178 are turned on, P-FET 174 and N-PET 180 are off to thereby apply the voltage at VCM voltage supply node 124 to node 172 and to ground node 170. By switching selectively between the above two states current flows through VCM coil 70 to cause movement of coil 70 which in turn causes attached actuator arm 62 to swing and thereby move transducer head 64 over an associated disk surface 56 or 58 to access target data tracks.

Thus, VCM voltage supply node 124 supplies its voltage to VCM driver 92 which is provided across VCM coil 70. The operation of VCM voltage control circuitry 120 to control the voltage of the VCM voltage supply node 124 is as follows. When VCM voltage supply node 124 is less than or equal to 12 volts, diode 128 conducts and thereby provides the 12 volts from fixed DC voltage power conductor 104 to VCM voltage supply node 124. During a track following operation, charging control signal 105 from servo controller 88 is at a high logic level and switch control circuit 134 provides a high voltage of approximately 12 volts to the gate of P-FET 130 and provides a high voltage of approximately 12 volts to the gate of N-FET 132. The high voltage level on the gate of P-FET 130 turns off P-PET 130, while the high voltage level on the gate of N-FET 132 turns on N-FET 132. With P-FET 130 off and N-PET 132 on, node 126 is brought to a ground voltage level. With node 124 at 12 volts and node 126 at the ground voltage level, boost capacitor 122 is charged to 12 volts during the track following operation.

During a track seeking operation, charging control signal 105 from servo controller 88 is at a low logic level, and switch control circuit 134 provides low or ground voltage levels to the gates of P-FET 130 and N-FET 132. With the gate of P-FET 130 at a low voltage level, P-PET 130 turns on, and with the gate of N-FET 132 at a low voltage level N-FET 132 turns off. With P-FET 130 on and N-FET 132 off, node 126 is brought to 12 volts. The charged value of boost capacitor 122 of 12 volts is added to the 12 volts of node 126 to bring VCM voltage supply node 124 to approximately 24 volts. When the voltage of VCM voltage supply node 124 is greater than the voltage (i.e., 12 volts) of the fixed DC voltage power conductor 104, diode 128 shuts off. Therefore, when VCM voltage supply node 124 is raised to 24 volts, diode 128 shuts off During a track seeking operation, boost capacitor 122 eventually discharges if the seek operation is long enough and VCM voltage supply node 124 is brought down to approximately 12 volts. When VCM voltage supply node 124 is no longer greater than the 12 volts of the fixed DC voltage power conductor 104, diode 128 conducts to provide the 12 volts from the fixed DC voltage power conductor to VCM voltage supply node 124.

Switch control circuit 134 operates as follows to properly transition node 126 from a ground voltage level to a high voltage level of 12 volts when starting a track seeking operation and from 12 volts to a ground voltage level when starting a track following operation. When charging control signal 105 is brought to a low logic level at the start of a track seeking operation, buffer 138 provides a low voltage level on node 140 which causes diode 144 to conduct to quickly discharge the high voltage on the gate of N-FET 132 through diode 144. In this way, N-FET 132 is quickly shut off. The low voltage level of node 140 is provided to node 160 via buffer 158, and with node 160 at a low voltage level and the gate of P-FET 130 at a high voltage level, diode 164 is off. The high voltage level on the gate of P-FET 130 slowly discharges through capacitor 168 based on the RC time constant of the RC filter comprising resistor 166 and capacitor 168. Therefore, P-FET 130 slowly turns on to slowly bring node 126 from the ground voltage level to the high voltage level of 12 volts based on the RC time constant of resistor 166 and capacitor 168.

When charging control signal 105 from servo controller 88 transitions to a high logic level at the start of a track following operation, buffer 138 and resistor 142 bring node 140 to a high voltage level. With the high voltage level on node 140, buffer 158 and resistor 162 bring node 160 to a high voltage level. With node 160 at a high voltage level, diode 164 conducts to quickly bring the gate of P-FET 130 to a high voltage level. Therefore, P-FET 130 quickly turns off. With node 140 at a high voltage level and the gate of N-FET 132 at a low voltage level, diode 144 is off. Thus, the gate of N-FET 132 is slowly charged to a high voltage level based on the RC time constant of the RC filter comprising resistor 146 and capacitor 148. In this way, N-FET 132 slowly turns on to thereby slowly bring node 126 from the high voltage level of 12 volts to the ground voltage level based on the RC time constant of resistor 146 and capacitor 148.

The RC filters employed by switch control circuit 134 represent one embodiment to generate a delay between tuning off N-FET 132 and tuning on P-FET 130 at the start of a track seeking operation and to generate a delay between turning off P-FET 130 and turning on N-FET 132 at the start of a track following operation to prevent shoot-through from occurring in P-FET 130 and N-FET 132. Numerous other circuit techniques can be employed in place of the RC filters to generate these delays. For example, comparators could be used to turn on P-FET 130 at the start of a seek operation only after a proper delay time, and to turn on N-FET 132 at the start of a track following operation only after a proper delay time.

A suitable value for boost capacitor 122 is approximately 470 microfarads. One benefit of the VCM voltage control circuitry 120 according to the present invention is that boost capacitor 122 can be employed for multiple functions in addition to its boost capacitor function. For example, capacitor 122 functions as a bulk and filtering capacitor in one embodiment of disk driver 30 and is employed to minimize instantaneous current drawn on the 12 volt standard power supply 38 to reduce ripple current during normal operations.

Increased VCM Voltage

As explained above, the torque developed by VCM 60 can be increased as a result of increasing the VCM voltage. The increased VCM torque reduces seek times by increasing the acceleration rate of the VCM during seek operations. The following discussion, equations, and examples illustrate (1) how the increased VCM voltage reduces a seek time during a seek operation and (2) the discharge rate of boost capacitor 122 and the energy required to move the actuator assembly during the seek operation. The acceleration rate (a) of VCM 60 is estimated by the following Equations II:

Equations II $$a = d\omega/dt = \dot{\omega}(Kt/J)I_{coil}$$

$$I_{coil} = (V_{source} - \omega * Kt)/R_t$$

where:
- a is the acceleration rate of the VCM;
- ω is angular velocity of the transducer head;
- Kt is the torque constant of the VCM;
- J is the moment of inertia of the actuator assembly (i.e., load);
- $I_{coil}$ is the VCM coil current;
- $V_{source}$ is the voltage of the VCM power source supplying power to the VCM;
- $R_t$ is the total resistance of the VCM coil and power FETs driving the VCM coil from the VCM power source to ground; and Equations II neglect the effect of inductance.
The following Equations III–V approximate seek time ($t_{seek}$) as follows:
By integrating a=dω/dt=constant from Equations II:

Equations III $$\omega(t) = a * t_{seek} + \omega(0)$$

$$\omega(t) = a * t_{seek}, \text{ if } \omega(0) = 0$$

where:
- Acceleration rate (a) is assumed to be constant during the acceleration portion and the deceleration portion of a seek operation; and
- $t_{seek}$ is the seek time to move the transducer head from a current data track to a target data track, but not including the settling time.

By integrating $\omega(t) = a * t_{seek}$ from Equations III:

Equation IV $$\theta(t) = \frac{1}{2} * a * t_{seek}^2$$

Solving Equation IV for t:

Equations V $$t_{seek} = \sqrt{\frac{2 * \theta_{seek}}{\alpha}}$$

$$= \frac{\sqrt{2 * \theta_{seek}}}{\sqrt{\alpha}}$$

$$= \frac{\text{CONSTANT}}{\sqrt{\alpha}}$$

where:
- $\theta_{seek}$ is the seek length arc or the angular displacement the transducer head moves during the seek.

As can be shown by Equations II above, the acceleration rate (a) is proportional to $V_{source}$, such that a doubling of $V_{source}$ produces approximately a doubling of acceleration rate (a). By Equations V, a doubling of acceleration rate (a), reduces seek time ($t_{seek}$) by:

$$\frac{t_{seek2}}{t_{seek1}} = t_{seek2} * \frac{1}{t_{seek1}} = \frac{\text{CONSTANT}}{\sqrt{2\alpha}} * \frac{\sqrt{\alpha}}{\text{CONSTANT}} =$$

$$\frac{1}{\sqrt{2}} = 0.707 \approx 30\%.$$

Thus, if the torque constant (Kt), the moment of inertia (J), and the Rt are fixed, and $V_{source}$ to the VCM is doubled, then the acceleration rate (a) approximately doubles, which reduces the seek time ($t_{seek}$) by approximately 30%.

The energy ($E_{old}$) required to move the actuator assembly to thereby move the transducer head from a current data track to a target data track during a seek traversing approximately one-third of the actuator stroke with a 12 volt power source is approximately given by the following Equations VI:

Equations VI $$E_{old} = V_{source(old)} * I_{seek(old)} * t_{seek(old)}$$

-continued $$= 12V * 0.53A * 4.1 \text{msec}$$
$$= 26.1 \text{mJ}$$

where:
The 0.53 A and 4.1 msec values are example values taken from empirical simulations for a 12 volt VCM power supply.

The energy ($E_{new}$) required to move the actuator assembly to thereby move the transducer head from a current data track to a target data track during a seek traversing approximately one-third of the actuator stroke with a 24 volt power source is approximately given by the following Equation VII:

Equations VII $$E_{new} = V_{source(new)} * I_{seek(new)} * t_{seek(new)}$$

$$= V_{source(new)} * \left(\frac{V_{source(new)}}{R_t}\right) * t_{seek(new)}$$

$$= 2 * V_{source\ old} * \left(\frac{2 * V_{source(old)}}{R_t}\right) * 0.7(t_{seek(old)})$$

$$= 2.8 * E_{old} = 2.8 * (26.1) = 73.1 \text{mJ}$$

The energy to perform the seek operation is drawn from boost capacitor 122 and power supply 38. The energy ($E_c$) stored in boost capacitor 122 is approximately given by the following Equation VII:

Equation VIII $$E_c = \frac{1}{2} * C * V^2$$
$$= \frac{1}{2} * 470\,\mu F * 12^2$$
$$= 33.8 \text{mJ}$$

where:
C is the capacitance of the capacitor; and
V is the charged capacitor voltage.

The discharge time (dt) of boost capacitor 122 during the seek operation is approximately given by the following Equation IX:

Equation IX $$dt = \frac{C * dv}{I_{AveSeek}}$$
$$= \frac{470\,\mu F * 12}{1.06 A} = 5.32 \text{ mSec}$$

where:
dt is the discharge time of the capacitor;
dV is the charged voltage stored in the capacitor; and
$I_{Aveseek}$ is the average current drawn from the capacitor during the seek (which is approximated as 2×0.53 A).

According to Equation IX above, the energy ($E_c$) from boost capacitor 122 consumed during the one-third stroke seek operation will not entirely deplete the charge on capacitor 122, because the seek time ($t_{seek}$) is between 4.1 mSec (seek time from simulation results for 12 volt VCM power source) and 2.9 mSec (seek time for 24 volt VCM power source, which is approximately 0.707×4.1 mSec as shown above) and boost capacitor 122 takes approximately 5.32 mSec to fully discharge.

Disk drive 30 includes capacitor 122 which is charged during track following operations so that the charged energy of capacitor 122 can be employed during track seeking operations to increase the voltage to VCM 60. The increased VCM voltage permits the torque constant of VCM 60 to be increased to allow greater torque to be developed by VCM 60 resulting in reduced data access times during seek operations. The increased VCM voltage advantageously permits the torque constant of VCM 60 to be increased while allowing for a corresponding reduction in VCM coil current to reduce $I^2R$ power losses in disk drive 30 while still maintaining a given torque in VCM 60.

We claim:

1. A disk drive connectable to a power supply having a fixed DC voltage, the disk drive comprising:
   a voice coil motor (VCM) having a coil;
   a fixed DC voltage power conductor connected to the power supply;
   a controller providing a charging control signal, wherein the charging control signal is at a first level while the disk drive is performing a track following operation and at a second level while the disk drive is performing a track seeking operation;
   a VCM voltage control circuit comprising:
      a first node;
      a second node;
      a ground node;
      a diode coupled between the fixed DC voltage power conductor and the first node to provide the fixed DC voltage to the first node;
      a capacitor having a first terminal coupled to the first node and a second terminal coupled to the second node;
      a first switch coupled between the fixed DC voltage power conductor and the second node and having a first control gate;
      a second switch coupled between the ground node and the second node and having a second control gate; and
      a switch control circuit coupled to the first and second control gates, wherein:
         the switch control circuit is responsive to the charging control signal being at the first level to cause the first switch to turn off and the second switch to turn on to charge the capacitor to approximately the fixed DC voltage;
         the switch control circuit is responsive to the charging control signal being at the second level to cause the second switch to turn off and the first switch to turn on to increase the DC voltage of the first node to an increased DC voltage greater than the fixed DC voltage, wherein the diode de-couples the first node from the fixed DC voltage power conductor while the DC voltage of the first node is greater than the fixed DC voltage; and
   a voice coil motor driver having switching elements coupled to the first node and the coil of the voice coil motor which are controllable to provide the DC voltage of the first node across the coil.

2. The disk drive of claim 1 wherein the capacitor also minimizes instantaneous current drawn on the power supply.

3. The disk drive of claim 1 wherein the first switch comprises a field effect transistor.

4. The disk drive of claim 1 wherein the second switch comprises a field effect transistor.

5. The disk drive of claim 1 wherein the switch control circuit is responsive to the charging control signal being at the first level to cause the first switch to quickly turn off and the second switch to slowly turn on.

6. The disk drive of claim 5 wherein the switch control circuit includes a RC filter coupled to the second control gate.

7. The disk drive of claim 5 wherein the switch control circuit includes a second diode coupled to the first control gate.

8. The disk drive of claim 1 wherein the switch control circuit is responsive to the charging control signal being at the second level to cause the second switch to quickly turn off and the first switch to slowly turn on.

9. The disk drive of claim 8 wherein the switch control circuit includes a RC filter coupled to the first control gate.

10. The disk drive of claim 8 wherein the switch control circuit includes a second diode coupled to the second control gate.

11. The disk drive of claim 1 wherein the switch control circuit includes:

a first buffer receiving the charging control signal and having an output;

a second diode coupled between the second control gate and the output of the first buffer;

a first resistor coupled between the second control gate and the output of the first buffer;

a second capacitor coupled between the second control gate and the ground node;

a second buffer receiving the output of the first buffer and having an output;

a third diode coupled between the first control gate and the output of the second buffer;

a second resistor coupled between the first control gate and the output of the second buffer; and a third capacitor coupled between the first control gate and the ground node.

12. A method of providing increased voltage to a voice coil motor in a disk drive connectable to a power supply having a fixed DC voltage, the method comprising the steps of:

receiving the fixed DC voltage from the power supply;

providing a charging control signal having a first level while the disk drive is performing a track following operation and having a second level while the disk drive is performing a track seeking operation;

controlling a voltage to a first node by the following steps:
providing the fixed DC voltage to the first node;
grounding a second node in response to the charging control signal being at the first level;
charging a capacitor coupled between the first node and the second node to approximately the fixed DC voltage in response to the charging control signal being at the first level;
increasing the DC voltage of the first node to an increased DC voltage greater than the fixed DC voltage by providing the fixed DC voltage to the second node in response to the charging control signal being at the second level; and
de-coupling the first node from the fixed DC voltage while the DC voltage of the first node is greater than the fixed DC voltage; and providing the DC voltage of the first node to the voice coil motor.

* * * * *